United States Patent
Zhang et al.

(10) Patent No.: US 9,201,476 B2
(45) Date of Patent: Dec. 1, 2015

(54) BAGGED COOLING STAND FOR LAPTOP COMPUTER

(71) Applicants: Yuejie Zhang, Frankfort, IL (US); Shifang Xu, Frankfort, IL (US)

(72) Inventors: Yuejie Zhang, Frankfort, IL (US); Shifang Xu, Frankfort, IL (US)

(*) Notice: Subject to any disclaimer, the term of this patent is extended or adjusted under 35 U.S.C. 154(b) by 0 days.

(21) Appl. No.: 14/033,367

(22) Filed: Sep. 20, 2013

(65) Prior Publication Data

US 2015/0115012 A1 Apr. 30, 2015

(51) Int. Cl.
| | |
|---|---|
| *G06F 1/20* | (2006.01) |
| *A45C 13/00* | (2006.01) |
| *A45C 11/00* | (2006.01) |
| *G06F 1/16* | (2006.01) |
| *A47B 23/04* | (2006.01) |

(52) U.S. Cl.
CPC ............... *G06F 1/203* (2013.01); *A45C 11/00* (2013.01); *A45C 2011/003* (2013.01); *A45F 2200/0525* (2013.01); *A47B 23/044* (2013.01); *A47B 2023/049* (2013.01); *G06F 1/1628* (2013.01)

(58) Field of Classification Search
CPC ............... G06F 1/1628; A47B 23/044; A47B 2023/049; A45F 2200/0525
USPC ............... 224/930; 206/320; D14/447
See application file for complete search history.

(56) References Cited

U.S. PATENT DOCUMENTS

| | | | | |
|---|---|---|---|---|
| 4,929,948 A | * | 5/1990 | Holmberg | 206/320 |
| 5,337,985 A | * | 8/1994 | Hale | 248/174 |
| 5,400,903 A | * | 3/1995 | Cooley | 206/320 |
| 5,732,928 A | * | 3/1998 | Chang | 248/688 |
| 5,857,568 A | * | 1/1999 | Speirs | 206/320 |
| 6,491,278 B1 | * | 12/2002 | Thomsen | 248/460 |
| 6,700,775 B1 | * | 3/2004 | Chuang et al. | 361/679.01 |
| 6,745,897 B2 | * | 6/2004 | Barber et al. | 206/320 |
| 6,967,836 B2 | * | 11/2005 | Huang et al. | 361/679.46 |
| 7,384,020 B2 | * | 6/2008 | Hsu | 248/146 |
| 7,417,853 B1 | * | 8/2008 | Myers et al. | 361/679.55 |
| 7,600,736 B2 | * | 10/2009 | Lee | 248/551 |
| D624,922 S | * | 10/2010 | Hui et al. | D14/447 |
| 7,881,053 B1 | * | 2/2011 | Huang | 361/679.48 |
| 7,886,903 B1 | * | 2/2011 | Wurzelbacher et al. | 206/320 |
| 7,909,161 B2 | * | 3/2011 | Sween et al. | 206/320 |
| 8,087,632 B2 | * | 1/2012 | Liu | 248/371 |
| 8,089,753 B2 | * | 1/2012 | Dotson | 361/679.48 |
| D657,794 S | * | 4/2012 | Hayes et al. | D14/421 |
| 8,611,086 B1 | * | 12/2013 | Magnusson et al. | 361/679.59 |
| D697,069 S | * | 1/2014 | Tak et al. | D14/447 |
| 8,749,960 B2 | * | 6/2014 | Mori | 361/679.03 |
| 8,844,892 B2 | * | 9/2014 | Robinson | 248/456 |
| 8,915,558 B2 | * | 12/2014 | Sween et al. | 312/223.3 |
| 8,926,414 B1 | * | 1/2015 | Kirkpatrick | 454/184 |
| 8,955,815 B2 | * | 2/2015 | White | 248/558 |
| 2004/0150628 A1 | * | 8/2004 | Huang et al. | 345/173 |

(Continued)

*Primary Examiner* — Justin Larson (57) ABSTRACT

A bagged cooling stand for raising a laptop computer to increase air circulation comprises a sleeve, a pocket, a foldable cooling stand. The folded cooling stand is anchored inside of the pocket. The self contained cooling stand comprises a frame, leaves, and pins. There are 2 opposite slopes in the ribs reinforced flat frame for locking the leaves on standing up position with gravity of a laptop. The cooling stand has flat shape and similar outside profile of the pocket for storing and portable, and is strong enough as a portable desk. After opening the pocket and setting up the leaves of the stand on user's lap, a laptop can seats on lifted edges of the leaves for free air flowing and lowering temperature of the laptop. Lower temperature will increase the performance of a laptop and make user operate on his lap comfortably.

2 Claims, 5 Drawing Sheets

(56) References Cited

U.S. PATENT DOCUMENTS

| | | | |
|---|---|---|---|
| 2006/0285283 A1* | 12/2006 | Simonian et al. | 361/679 |
| 2008/0023283 A1* | 1/2008 | Sutker et al. | 190/100 |
| 2008/0054149 A1* | 3/2008 | Freebairn | 248/346.02 |
| 2009/0097198 A1* | 4/2009 | Liu | 361/679.48 |
| 2010/0270188 A1* | 10/2010 | Dotson | 206/320 |
| 2012/0186498 A1* | 7/2012 | Wallach | 108/43 |
| 2014/0061084 A1* | 3/2014 | Westrup et al. | 206/472 |
| 2014/0166234 A1* | 6/2014 | Chen | 165/80.2 |
| 2014/0263936 A1* | 9/2014 | Desantis | 248/676 |
| 2014/0362504 A1* | 12/2014 | Liang et al. | 361/679.3 |

* cited by examiner

Fig.6 SECTION A-A
SEE DETAIL A

Fig.7 DETAIL A

Fig.9 DETAIL B

SEE DETAIL B

Fig.8 SECTION A-A

Fig. 10 SECTION A-A

BAGGED COOLING STAND FOR LAPTOP COMPUTER

CLAIM OF PRIORITY

This application claims priority of U.S. Provisional Patent Application 61/713,583 entitled A BAG WITH A FOLDABLE COOLING PAD FOR LAPTOP COMPUTER, filed Oct. 14, 2012, the teaching of which are incorporated herein by reference.

FIELD OF THE INVENTION

The present invention relates to a portable stand and a bag for supporting a portable laptop computer in a use position supported on a user's lap when the user is in a sitting or relined position, or storing a portable laptop computer and the portable stand while a user don't use the laptop computer.

BACKGROUND OF THE INVENTION

This relates to bags that carrying & storing a personal portable electric device, specifically for operating & cooling a hot portable electric device on top of a portable electronic device bag. This portable electronic device bag must be put on user's lap lightly and comfortably. Along with portable electric device spread out everywhere, more and more people operate their personal portable electric device everywhere anytime. A portable electronic device, laptop, can generate heat and raise temperature of electronic devices. Higher temperature not only makes operator uncomfortable, but also impacts performance of portable electronic devices.

Although some cooling device, fans or radiator already embedded in a portable electronic device, overheating still bother users and impacts performance. Poor air flowing under bottom of laptop is one major reason caused problem. Lifting up a laptop for adding air circulation space is a simple solution. More space under the laptop not only cools down the computer, but also guide hot air far away user's legs.

There are many different kinds of bags, sleeves, cases for carrying & storing personal portable electric devices in suitable manners. A hard case is good for accommodating a laptop, but heavy weigh and hard surface make user uncomfortable. A soft bag is natural option for user to operate on its top surface, but a soft bag not only traps the device's body, but also traps heat from a portable electronic device. A trapped portable electronic device generates and gathers more heat that will worse performance of electronic device and make operator uncomfortable. It is not recommended to operate a portable electronic device on a soft surface from electronic device manufacturers. Putting and operating a laptop inside a bag will trap more heat than on an open space. Making a soft bag has one soft side and one hard side will be a special and good design as a laptop stand.

For overcoming soft surface problem, many different kinds of stands, mini tables, desk, panels, pads, cooling pads are made for operating on user's legs comfortably and or further cooling down a hot portable electronic device. Most of cooling pads includes a hard bottom panel, side walls (brackets), a hard top panel. Some side walls are adjustable and supporting a top panel vs. the bottom of a laptop. All of above have a hard enough top panel for better supporting a portable electronic device without significant deformation. The side walls (brackets) of desk and pad are not designed to support the bottom of portable electronic device directly. Some stands support the bottom of a laptop computer by side edges. For better air flowing under the bottom of a laptop, there are maybe some big slots, mesh holes, or curved surfaces in the top panel. A hard top panel design is close to normal table top function, but there is a flat air chamber between a top panel and the bottom of laptop. This narrow air chamber prevents air from flowing freely to the bottom of a portable electronic device. Heat gathers in this narrow air chamber. Additional fans maybe need to force blowing heat out off the bottom of electronic devices. Because a flat plastic sheet hasn't enough stiffness, thicker panel is popular design among exist cooling pads, that make it impossible to fit into a light, thin laptop sleeve.

There are also some laptop cooling device in wide range of shapes such as bracket, bar, ball, rod, wire stand etc. without a hard top panel. All of them are intend to set on a table or desk vs. operating on user's lap or on a soft bag top. In the view of comfortably operating on user's legs, a softer bottom panel is necessary for all of laptop cooling device. Most of important is all of stands, mini tables, panels, pads, cooling pads are not designed to be stored and anchored inside of the pocket of a light portable electronic device's bag. They are not self-contained.

Many of laptop cooling pad are designed for portable and fit into a big bag, such as backpack, suit case, travel bag, but they are not intend to be fit and anchored on a laptop size pocket. For fitting and fixing inside of a thin pocket without doubling size and weight, a cooling pad must be designed special in lighter, thinner, and stronger for easy storing and carrying.

Hinge is a normal application in our daily life, hinges are used to connect 2 pieces of panel together such as piano hinges, position hinges, lever-lock hinges, and friction hinges. A set-angle position hinges holds doors open at a set angle without secondary mechanical support. Photo stand is one example of changing a hinge layout and standing up for supporting a photo on a table. It is abnormal application to use a hinge leaf support something directly. It is also not a natural option to use hinges to support a laptop securely and operate it comfortably on user's lap without additional concerning and work.

In conclusion, insofar as I am aware, no laptop bag formerly developed provides a pocketed foldable-hinge style cooling stand to a user comfortably operating & cooling down a portable electronic device on his lap.

SUMMARY

An improved laptop computer bag has an attached cooling stand folded inside of the pocket of the bag. Our invention combines a foldable cooling stand within a laptop sleeve pocket as a multi functional bag. Our invention comprises a foldable cooling stand, a zippered pocket, and a sleeve assembly.

A sleeve with a zippered pocket is normal design for laptop bag, but by present none has fixed a cooling pad inside the pocket. Our invention adopt normal sleeve design, but add new part and functions for achieving a specific goal, cooling down a laptop on user's lap.

Our foldable cooling stand assembly is consisting of a frame, right (or front) leaf, left (or back) leaf, 2 pins. The foldable cooling stand is anchored inside of the zippered pocket and on the top of the sleeve by rivets. For better stability, less weight, higher rising, and more open space in a limited thin space of pocket, we make a few special arrangements as below:
  a). The foldable cooling stand has close outside profile to the pocket and sleeve. This flat shape gains maximum pad size as a base of stand without significant increasing of size and weight. The foldable cooling stand is fixed on the top of sleeve for stability.

b). To use only one reinforced frame vs. normal art of top and bottom panel. This flat rectangle frame matches the shape of the sleeve. Ribs and beams are extruded in the frame for better stiffness than a thin sheet in the same weight of material. This kind of ribs and beams can prevent the frame deformation. This reinforced frame provides a stable pad on lap, also act a foundation of leaves.

c). In our invention leaves are not like a normal hinges for connecting 2 pieces in relevant angle, our leaves work as support pillars directly. Leaves are made in long flat shape with holes. Changed shape and edges are stronger and lighter for the specific goal, supporting a laptop securely. A laptop will be lifted by edges of leaves of the invention.

d). 2 steep slopes are constructed in opposite sides of the frame for locking leaves position. Two leaves rotate an obtuse angle and stop against the slopes. An external portable electronic device, laptop seat on the leaves firmly because gravity of the laptop generate a torque offset the pin axle. Weight of laptop apply on edges of leaves directly and lock position. The bottom of laptop, leaves, and the frame forms a close loop for supporting laptop firmly.

e) The leaves can be arranged in right and left side by side in a pairs, or they can be arranged as lower front leaf and higher back leaf manner on the frame.

f). There are many vents in lower part of the pocket cover for air and heat flowing. The pocket cover can be made from different material for better ventilating.

There is space between 2 leaves in the top pocket for accommodating other accessory such as a fan, battery, cords etc. This compact and strong laptop bag with a cooling pad can be used as a comfortable pad directly without opening pocket and set up the leaves. Erecting the leaves of the cooling pad can expel more heat from a laptop.

The advantages of this Bagged Laptop cooling stand are to add new function in a laptop bag, to provide means of increasing the air flow under a laptop, to provide a comfortable operating platform on user's lap, to provide a freedom of carrying a cooling pad in one bag.

DRAWINGS

FIG. 3 is a perspective view of a bag with a cooling stand, showing the cooling stand is set up in operation for support a laptop and like.

DETAILED DESCRIPTION

Figure 1:
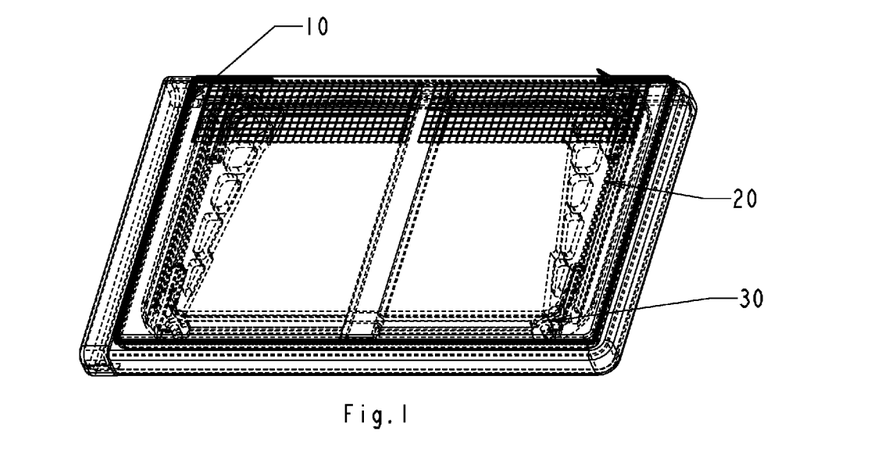
FIG. 1 is a perspective view of a bag with a pocketed folded cooling stand in accordance with the invention, showing in carrying and storing before take a laptop out of the bag, open the bag pocket, and set up a cooling stand.

FIG. 1 is a perspective view of a laptop bag with a folded cooling stand comprises a bag 10, a cooling stand 20, and rivets 30 before opening and setting up for accommodating a portable electronic device. Bag 10 is housing an external laptop and a folded cooling stand 20. The folded cooling stand 20 is fixed on the top pocket of the bag 10 by rivets 30 for stable operation. A laptop can settle on top of bag 10 without set up the folded cooling stand 20.

Figure 2:
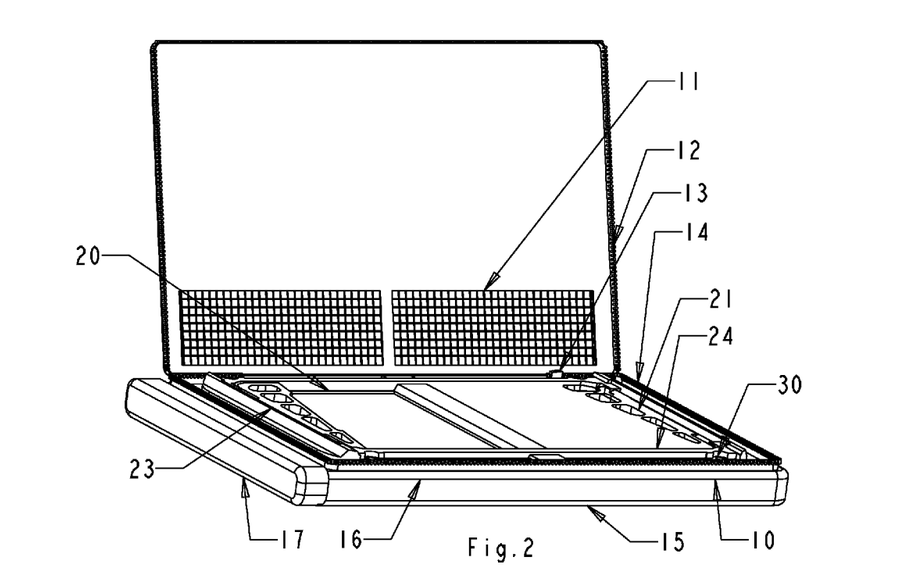
FIG. 2 is a perspective view of a bag with a cooling stand, showing the opening of the bag pocket before to set up the cooling stand.

FIG. 2 is a perspective view of a laptop bag with a folded cooling pad that comprises a bag 10, a folded cooling stand 20, and rivets 30 after opening top pocket 11 of the bag 10. A bag 10 is comprised of a top pocket 11 and a sleeve 15. The sleeve 15 comprises a sleeve body 16 and a cap 17. An external laptop can be put into the sleeve 15 for protected and carry around. The sleeve body 16 and the cap 17 are made from light and soft material for laptop bag and suitcase, such as fabric, leather, cloth, neoprene, polyester etc. The sleeve body 16 is in a rectangle shape with round corners. A few holes are opened on the top of sleeve body 16 for attached with a frame 24 of cooling stand 20 by rivets 30 firmly. The top pocket 11 comprises a pocket cover 12, zipper 13, and a tape base 14. The pocket cover 12 and tape base are made from the same kinds of material as the sleeve 15. There are many vents in lower part of the pocket cover 12 for air and heat flowing. Zipper 13 is standard set included zipper and tapes. Rivets 30 are standard fastening parts that are made from plastic, aluminum, stainless steel etc. A folded cooling stand 20 lay down inside of the top pocket 11. The cooling pad 20 comprises a right leaf 21, a left leaf 23, 2 pins 22, a frame 24. The cooling stand 20 works like a pair of hinges. The frame 24 has similar outer profiles of top pocket 11 and sleeve 15 for storing and maximum size. The frame 24 is attached on the top of the sleeve body 16 by rivets 30 for gaining stability. The maximum size of the frame 24 and high ribs in the structure of the frame 24 provide a strong enough pad for supporting an external laptop. The detail structure of the frame 24 will be shown further in following figures. The right leaf 21 and the left leaf 23 can be opened an obtuse angle and support an external portable electronic device directly. An external portable electronic device will seat on edges of leaves 21 and 23. Weight of an external portable electronic device apply on edges of leaf 21 and 23 to generate torque that force leaf 21 and 23 against slopes of the frame 24 firmly for locking position and keeping designed elevation of laptop for free air flowing. The key structure of the slopes of the frame 24 will be shown further in FIGS. 6, 7, 8, 9, and 10. The slopes of the frame 24 limit the position of leaves 21 and 23.

The arrangement of right leaf 21 and left leaf 23 can be turned 90° become front leaf 21 and back leaf 23 as shown further in FIG. 13, FIG. 14, FIG. 16, FIG. 17.

Figure 3:
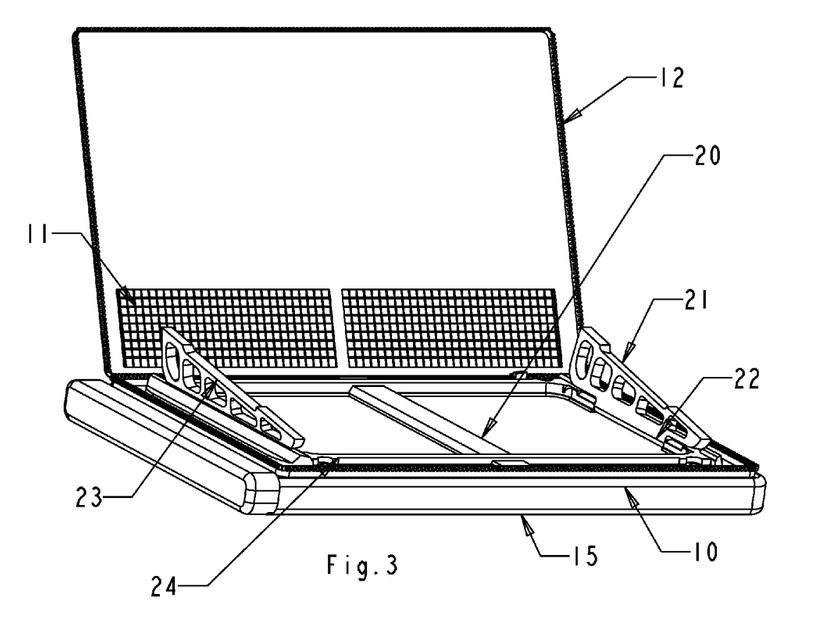

FIG. 3 is a perspective view of a standing up cooling stand 20 seats inside of the top pocket 11 and on the top of sleeve 15 of the bag 10. The frame 24 is anchored on the top of sleeve 15 of the bag 10. Right leaf 21 rotates an obtuse angle around the pin 22 axis and stopped by frame 24. Left leaf 23 turns a obtuse angle around the pin 22 and limited by frame 24.

Figure 4:
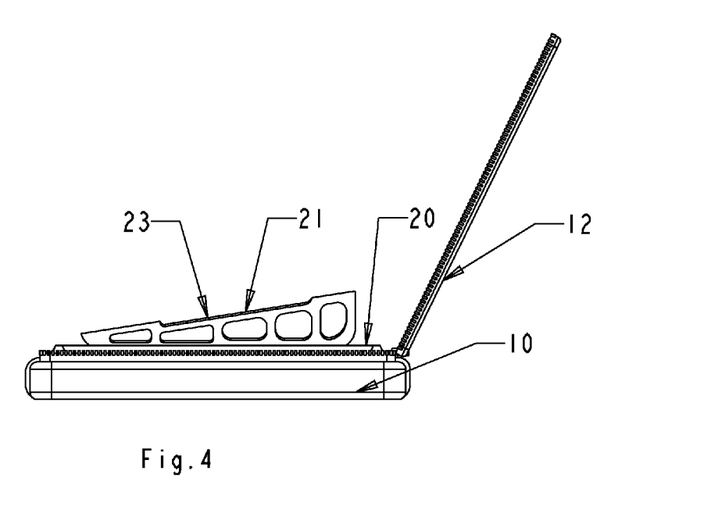
FIG. 4 is a right side view of a bag with a cooling stand, showing the cooling stand in standing up status. A laptop will seat on edges of leaves.

FIG. 4 is a right view of a standing up cooling stand 20 on the top of bag 10. The pocket cover 12 can be opened widely as an opened notebook. Leaves 21 & 23 always keep a laptop in lower front and higher back position.

Figure 5:
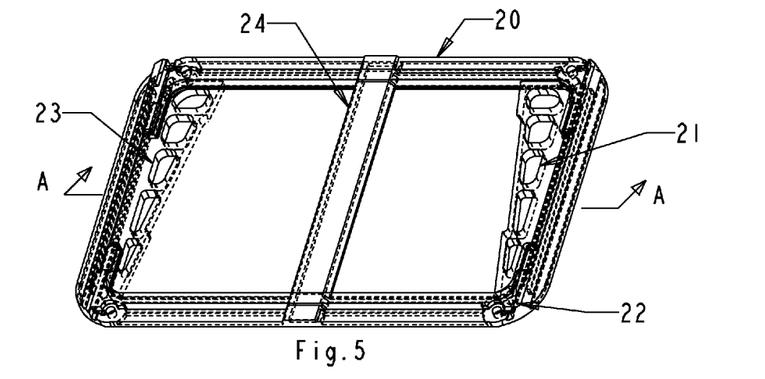
FIG. 5 is a perspective view of the foldable cooling stand with the invention, showing the folded status.

FIG. 5 is a perspective view of a folded cooling stand 20. The cooling stand 20 comprise a right (or alternative front) leaf 21, 2 pins 22, a left (or alternative back) leaf 23, a frame 24. The frame 24 is made of plastic, aluminum, alloy steel. Ribs are made for strengthening stiffness. Holes are even distributed for anchored with the sleeve. Right leaf 21 and left leaf 23 are symmetrical in a layout of right and left. In alternative layout, front leaf 21 is shorter than back leaf 23. See more detail in FIG. 11, FIG. 12, FIG. 13, FIG. 14, FIG. 15, FIG. 16 and FIG. 17.

Figure 6:
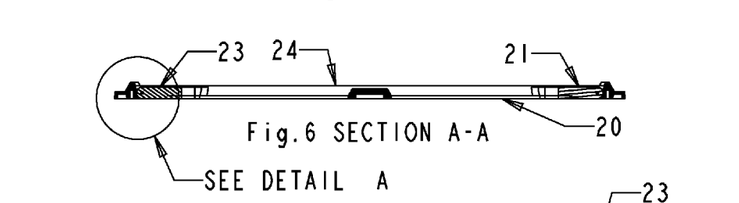
FIG. 6 is a section view of the folded cooling stand with the invention, showing structure of leaves, pins, a frame before set up.

FIG. 6 is a section view of the cooling stand 20 in folded storage status. Leaves 21 and 23 are always in opposite end of the frame 24 for supporting a laptop in a slope status.

Figure 7:
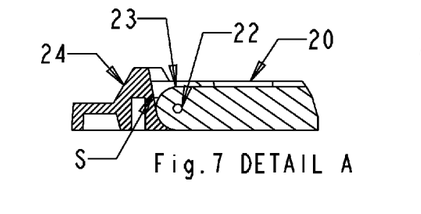
FIG. 7 is a partial detail view of FIG. 6, showing the function and structure of frame slope and folded leaf.

FIG. 7 is a detail view of left (or back) end of folded cooling stand 20. There is a steep slope S in frame 24 faces to round end of the leaf 23. The leaf 23 can rotate around pin 22 to approach the slope S of the frame 24. Ribs are for strengthen and cavities for reduce weight of the frame 24.

Figure 8:
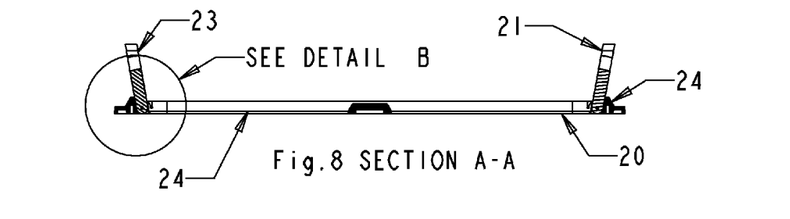
FIG. 8 is a section view of the erected cooling stand with the invention, showing operation of leaves, pins, a frame.

FIG. 8 is a section view of the cooling stand 20 standing up. Leaf 21 and leaf 23 are set up and held on position by the slopes S of frame 24 for supporting an external laptop. Both leaf 21 and leaf 23 have the same rotating movement.

Figure 9:
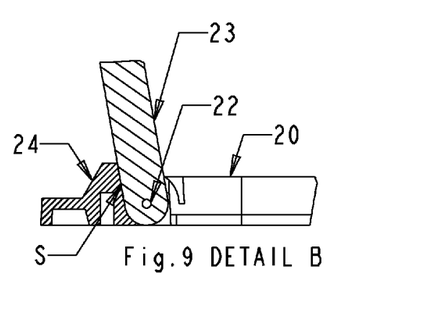
FIG. 9 is a partial detail view of FIG. 8, showing the function and structure of an erected leaf against the steep slope of the frame.

FIG. 9 is a detail view of a standing up cooling stand 20. Leaf 23 is rotated an obtuse angle around pin 22 and backed by the slope S in frame 24. An external laptop will seat on top edge of leaf 23. Laptop weight apply force is off the pin 22 and generate a torque on leaf 23. The torque prevents the leaf 23 fall back during operating. The leaf 21 has the same or close structure of leaf 23.

Figure 10:
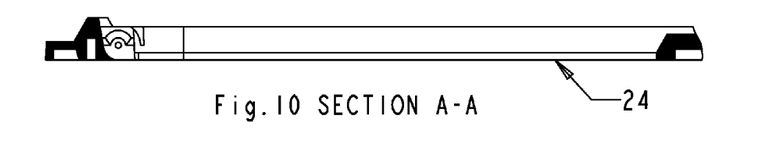
FIG. 10 is a partial section view of the frame, showing the structure before assembly with leaves and pins.

FIG. 10 is a partial section view of the frame 24. It shows a pin hole and section structure as shown in FIG. 6, FIG. 7, FIG. 8, and FIG. 9. The frame 24 is one piece of injected plastic, or other light material such as stamping metal sheet, casting aluminum etc. The frame 24 has a rectangle shape as the sleeve body 16 and top pocket 11. There are high ribs in the central beam and 4 side beams for reinforcing stiffness. 2 slopes are made in opposite side beams where leaves are depending on. 2 slopes are higher than the thickness of leaves as indicated in FIG. 7 and FIG. 9.

Figure 11:
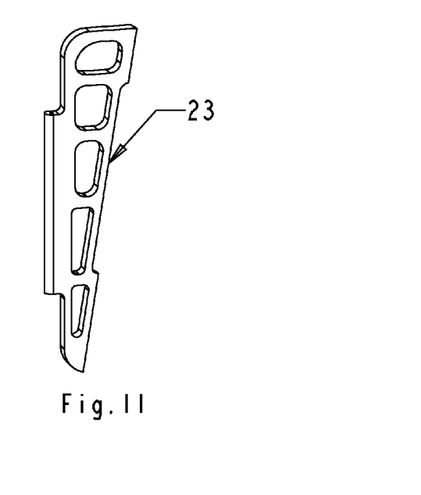
FIG. 11 is a perspective view of a left leaf with the invention.

FIG. 11 is a perspective view of left leaf 23. A few slots are opened for reducing weight. There is a long pin hole in the left leaf 23. The left leaf 23 can be made by plastic injection model or steel sheet stamping and rolling.

Figure 12:
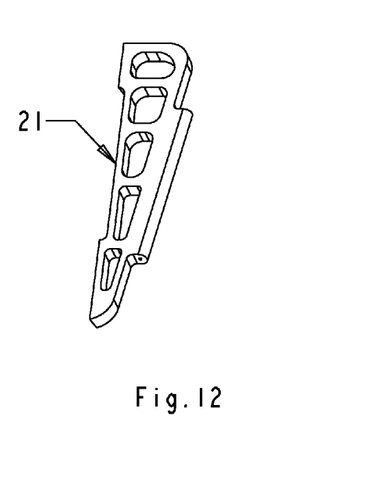
FIG. 12 is a perspective view of a right leaf with the invention.

FIG. 12 is a perspective view of right leaf 21. There are a few holes for less weight. A long pin hole is in the right leaf 21. The right leaf 21 can be made in the same way of left leaf 23.

Figures 13, 14:
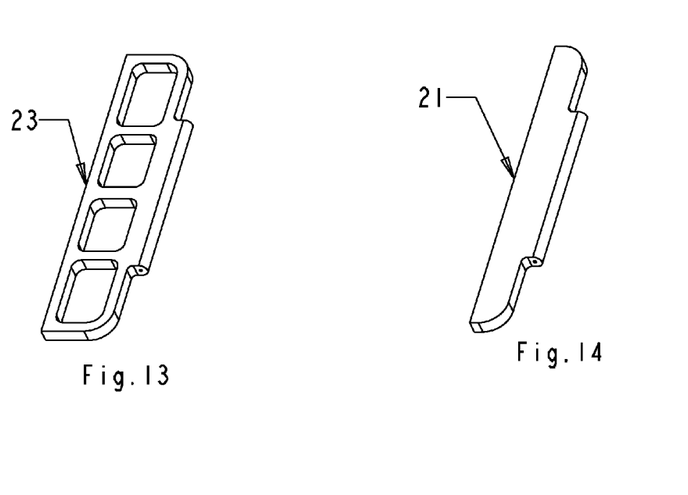
FIG. 13 is a perspective view of an alternative back leaf with the invention.
FIG. 14 is a perspective view of an alternative front leaf with the invention.

FIG. 13 is a perspective view of back leaf 23. Back leaf 23 is an alternative design for front-back set up. A long pin hole is made in the round edge of leaf 23.

FIG. 14 is a perspective view of front leaf 21. Front leaf 21 is an alternative layout of front and back leaves. A long pin hole is made in the round edge of leaf 23.

Figure 15:
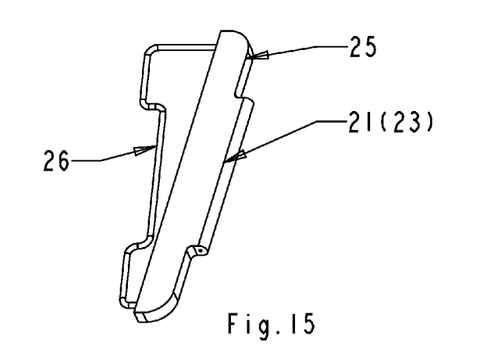
FIG. 15 is a perspective view of alternative left and right leaves with the invention.

FIG. 15 is a perspective view of right and left 21 (23). In this alternative design, right leaf 21 and left leaf 23 have identical structure that comprises a wire leaf 25 and a wire bracket 26. Leaf 25 is made by the same methods of leaf 21 and 23. The wire bracket 26 is made of steel wire and then plug into leaf 25. Leaf 25 is made the same method of leaf 21 and 23.

Figure 16:
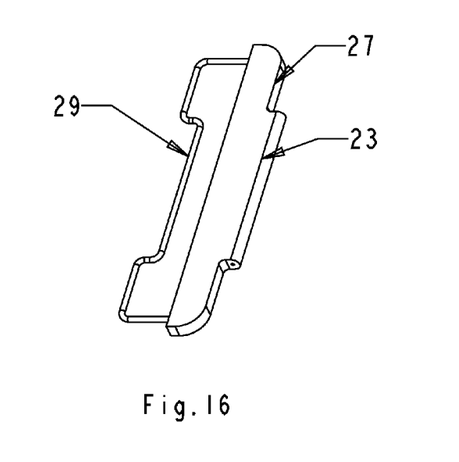
FIG. 16 is a perspective view of an alternative wire back leaf with the invention.

FIG. 16 is a perspective view of a back leaf 23. This alternative back leaf 23 comprises a base leaf 27 and a back wire bracket 29. The back wire bracket is made by the same method of wire bracket 26.

Figure 17:
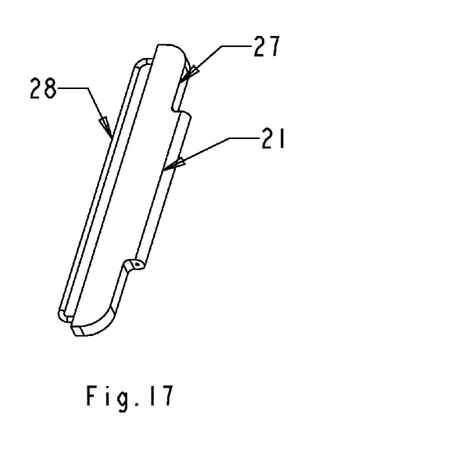
FIG. 17 is a perspective view of an alternative wire front leaf with invention.

FIG. 17 is a perspective view of a front leaf 21. This alternative front leaf 21 comprises a base leaf 27 and a front wire bracket 28. All are made in the same way of above.

REFERENCE NUMBER

10 Bag
11 Top Pocket
12 Pocket Cover
13 Zipper
14 Tape Base
15 Sleeve
16 Sleeve Body
17 Cap
20 Cooling Stand
21 Right (or Front) Leaf
22 Pin
23 Left (or Back) Leaf
24 Frame
25 Wire Leaf
26 Wire Bracket
27 Base Leaf
28 Front Wire Bracket
29 Back Wire Bracket
30 Rivets

OPERATION

This laptop bag with a cooling stand can be carried as a normal laptop bag or sleeve before set up the foldable cooling pad. If a laptop computer is not overheating, the invention can be used as a lap desk directly (1) Pull out a portable electronic device, laptop that is not included in this invention from the sleeve 15.
(2) Put the invention on your lap, or a table. The top pocket 11 faces up.
(3) Seat a laptop on the top pocket 11 directly without erecting the foldable cooling stand
(4) Start to operate the laptop computer.

If a user's laptop computer is overheating, or user want to keep heat far away from his legs, user should set up the folded cooling pad as below:

(1) Pull out a laptop that is not included in this invention from the sleeve 15.
(2) Put the invention on your lap, or a table. The top pocket 11 faces up.
(3) Drag the zipper 13 for opening the top pocket 11
(4) Open the pocket cover 12, folded cooling stand 20 shown up, and put the pocket cover 12 backward.
(5) In right-left layout, to rotate right leaf 21 of cooling stand 20 clockwise, to rotate left leaf 23 counter clockwise.

In front-back layout, to open front leaf 21 to you, to open back leaf 23 far away from you.

(6) Make sure leaves are against the slopes S of the frame 24 firmly.
(7) Set the laptop on leaves edges
(8) Operate your laptop

The invention claimed is:

1. A laptop bag, comprising:
a sleeve portion which will accommodate a laptop computer, and
a top pocket portion which stores and anchors a foldable cooling stand, and
a foldable cooling stand which is inside of the top pocket and anchored on the inside surface of the top pocket portion, said a sleeve portion, a top pocket portion, and a foldable cooling stand being joined at a middle of said laptop bag,
at least one leaf of said foldable cooling stand attached to the cooling stand of said laptop bag, wherein said leaf can be rotated to an obtuse angle and stopped by a slope of a frame of said foldable cooling stand,
whereby during a laptop computer set up operation, a laptop can be put on the top pocket or be seated on the edge of said at least one leaf of said foldable cooling stand of said laptop bag for cooling down a laptop and operating on user's lap comfortably.

2. The anchored foldable cooling stand of claim 1, further comprising a rectangle frame with two opposite slopes, pins, and leaves that will be rotated to obtuse angles and stopped by the slopes of the frame.

* * * * *